United States Patent [19]

Stadelmann

[11] Patent Number: 4,850,091
[45] Date of Patent: Jul. 25, 1989

[54] METHOD OF REPLACING A MACHINE PART

[75] Inventor: Peter W. Stadelmann, Zürich, Switzerland

[73] Assignee: BBC Brown Boveri AG, Baden, Switzerland

[21] Appl. No.: 48,743

[22] Filed: May 11, 1987

[30] Foreign Application Priority Data

May 19, 1986 [CH] Switzerland ............... 2013/86

[51] Int. Cl.⁴ .............................................. B23P 19/04
[52] U.S. Cl. ................................. 29/402.08; 29/402.03
[58] Field of Search ........... 29/402.03, 402.04, 402.08, 29/402.01, 402.09, 402.11

*Primary Examiner*—Timothy V. Eley
*Attorney, Agent, or Firm*—Oblon, Fisher, Spivak, McClelland & Maier

[57] ABSTRACT

In a method of replacing a machine part (5a, 5b) of a machine installation whose essential interconnected machine parts are arranged on a common base plate (7) which is secured in the ground by individual supports (8), a purpose-built base plate (7b) is produced in a preparatory phase, on an adjacent foundation slab (12), for the newly to be connected machine part (5b). On this base plate the machine part (5b) is provided with mountings, undergoes final assembly, is aligned and has all its functions tested. In a replacement phase, the machine part (5a) to be replaced is disconnected from the remaining machine part, its base plate section (7a) is servered from that (7) of the remaining machine part and from the individual supports (8) and it is displaced onto an auxiliary structure. The structural unit comprising the "machine part/base plate newly to be connected" (7b, 5b) is displaced by hydraulic means to take the place of the severed base plate. After the unit (5b, 7b) has received its final alignment, it is connected monolithically with the base plate section (7) of the remaining.

10 Claims, 3 Drawing Sheets

4,850,091

METHOD OF REPLACING A MACHINE PART

FIELD OF THE INVENTION

The invention relates to a method of replacing a machine part of a machine installation whose essential interconnected machine parts are arranged on a common baseplate which is secured in the ground, either directly or via a base slab, by individual supports.

BACKGROUND OF THE INVENTION

An example of this type of machine installation is, in particular, the multi-cylinder turbo set of a steam-generating plant, the machine parts comprising the individual turbine units and the generator.

The replacement of a machine part, whether planned or as the result of an accident, is an extremely time-consuming and thus, as a consequence of the long shut-down periods involved, a very cost-intensive operation. Even when the machine parts to be replaced are already stored on site in the form of replacement units, their initial assembly in particular and their alignment and testing all tell in terms of time.

If, in addition, system-related changes are to be made to the existing foundations, it may happen, for example in a nuclear installation, that the time required for this is greater than the shut-down time envisaged for the periodic replacement of fuel elements.

OBJECT OF THE INVENTION

It is here that the invention is intended to provide a remedy. Its object is based on the requirement for as rapid a modification of the installation as possible.

SUMMARY OF THE INVENTION

This object is achieved in an installation of the type mentioned at the outset by the procedural steps given below in their time sequence. The defining features are that, in a preparatory phase, a purpose-built base plate is produced, on newly erected auxiliary supports or on an adjacent foundation slab, for the machine part newly to be connected, this purpose-built base plate resting on the auxiliary supports or the existing foundation slab via adjusting elements, on this base plate the machine part newly to be connected is provided with mountings, undergoes final assembly, is aligned and has all its functions tested, and that, in a replacement phase, the machine part to be replaced is disconnected from the remaining machine part and its base plate section is severed from that of the remaining machine part and from the individual supports, either the machine part to be replaced is removed by lifting means and the severed base plate is broken away or the machine part to be replaced is displaced, together with the severed base plate, onto an auxiliary structure—preferably by hydraulic means, whereupon the structural unit comprising the "machine part newly to be connected/base plate" is displaced by hydraulic means to take the place of the severed base plate and is there lowered onto the individual supports by means of the same adjusting elements, and that, after the unit has received its final alignment, it rests exclusively on the adjusting elements and is monolithically connected to the base plate section of the remaining machine part and the individual supports.

It is particularly expedient if supplementary pillars are arranged, at as early a stage as the preparatory phase, against those individual supports which are in the immediate vicinity of the base plate section to be disconnected. In addition, the displacement tracks for the old and the new machine part should likewise be laid in this early phase, as should the auxiliary structure for receiving the old machine part.

BRIEF DESCRIPTION OF THE DRAWINGS

The drawings are diagrammatic illustrations of an exemplary embodiment of the invention. Only these parts which are essential for the understanding of the invention have been shown and these are used to illustrate the new method.

DETAILED DESCRIPTION OF THE PRESENTLY PREFERRED EMBODIMENT

Figure 1:
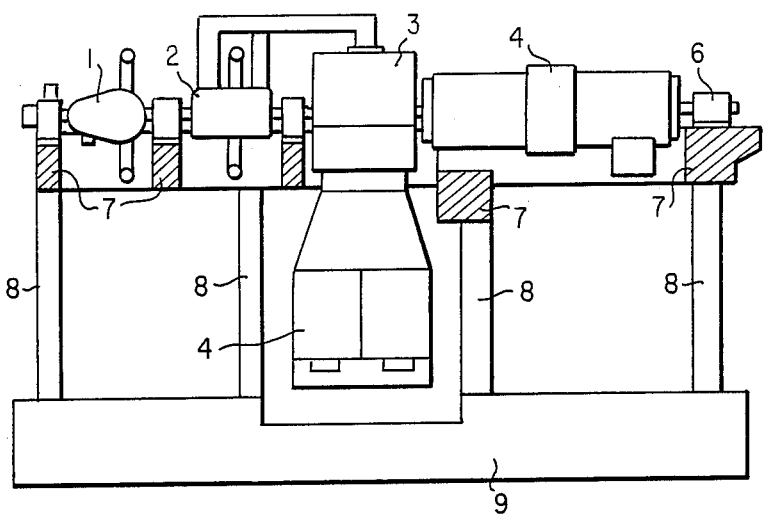
FIG. 1 shows a side view of a machine installation and foundation in longitudinal section.

The machine installation according to FIG. 1 is a steam-turbine set, its principal components being a high-pressure turbine subunit 1, an intermediate-pressure turbine subunit 2 and a low-pressure turbine subunit 3 connected to a condenser 4. The turbine subunits are connected to one another and to a generator 5 and an exciter 6. The turbo set rests on a foundation which is here composed of a base plate 7, a plurality of individual supports 8 and a base slab 9. Only the struts of the base plate 7 are visible. The base slab 9 rests on the ground.

Figure 2:
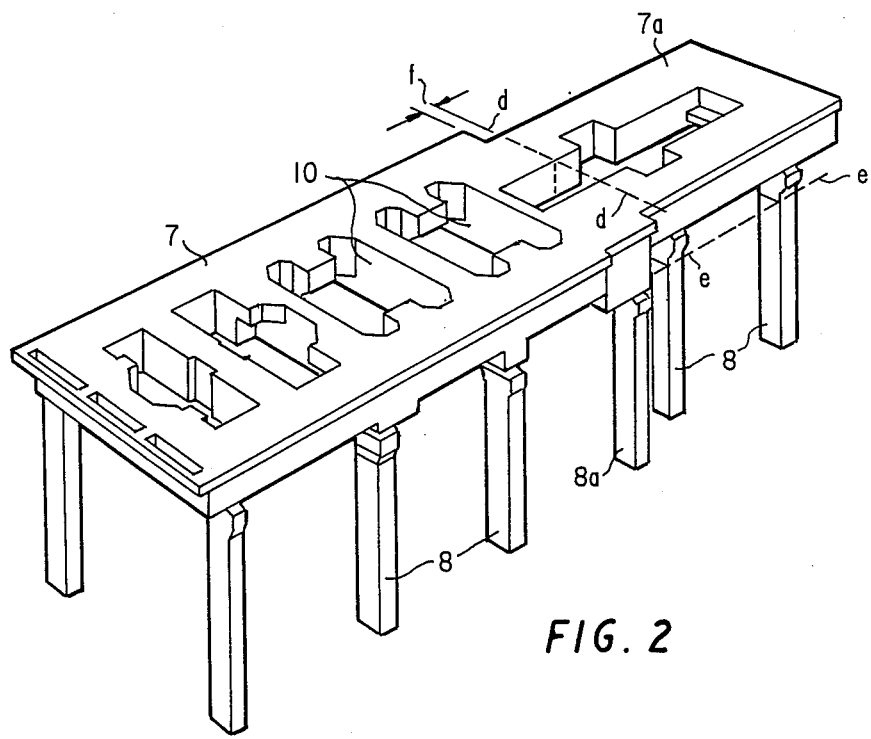
FIG. 2 shows a perspective view of a foundation made up of a base and individual supports.

FIG. 2 shows an unequipped foundation for a relatively large turbo set with two intermediate-pressure turbine subunits, for which recesses 10 are provided. A recess 11 accommodates the generator. The foundation can be either a monolithic concrete foundation or a spring foundation with individual supports.

For the purposes of explaining the invention it is assumed that a plate generator with a foundation according to FIG. 2 is to be replaced within the shortest possible time. This is to be carried out in a planned shut-down period.

In the text which follows, the machine part to be replaced and the machine part to be newly connected up will accordingly both be generators, while the remaining machine part will be the turbine subunits taken as a whole. The parts to be replaced will be identified by the subscript "a", while the new parts will be identified by the subscript "b".

According to the invention the exchange can only proceed quickly if the replacement operation encompasses not only the generator but also the associated section of the base plate.

From this point the procedure is divided into two distinct time periods.

Figure 4:
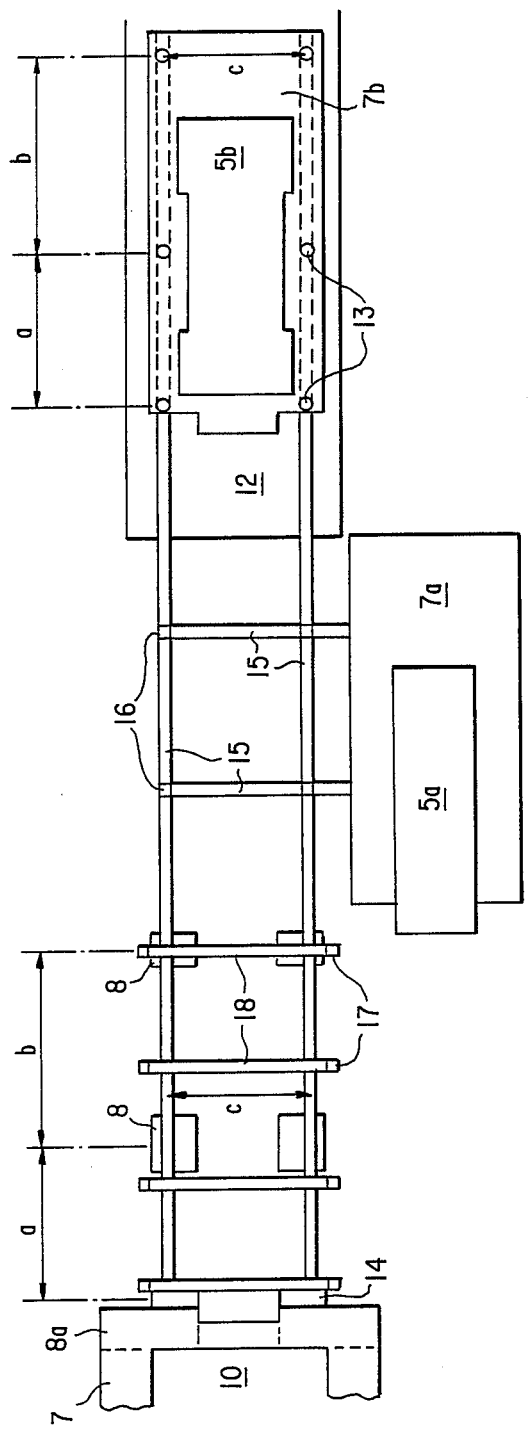
FIG. 4 shows the auxiliary structures and the replacement procedure.

In the first, the so-called preparatory phase, the following measures are to be taken:

Under the assumption made in FIG. 4 that a platform or an unused foundation 12 is available in the same horizontal plane in the immediate vicinity of the machine installation, a concrete base plate 7b for the new generator 5b is cast in a previously prepared shuttering on the foundation 12. It goes without saying that, should the need arise, a purpose-built auxiliary platform on appropriately dimensioned pillars would have to be erected.

After the concrete has set, the base plate 7b is raised by auxiliary means and lowered onto adjusting elements 13, the position of which is merely indicated in FIG. 4. Care should be taken that the adjusting elements 13 exhibit the same spacings, a, b, c relative to the base plate 7b and relative to one another as the corresponding individual supports 8 under the generator 5a which is to be removed. This measure ensures that the elastic line of the new structural unit 5b, 7b to be created remains constant under all circumstances. This means that the deformation configuration prevailing at the site of erection is the same as that at the final location. This is particularly important because the sealing gap in hydrogen-cooled generators is only about 1/10 mm and is thus very susceptible to disruption.

The new generator 5b is then assembled on the raised base plate 7b. The stator is mounted, the bearing blocks are assembled and the rotor is introduced into the stator and lowered into the bearings. The generator is aligned with respect to its final position. Electrical testing is then carried out, an electric motor (not shown) being connected as the drive.

The auxiliary installation for the new generator 5b are prepared underneath the base plate 7a of the still operating generator 5a while the generator is being assembled. Examples of auxiliary installations which may be mentioned are the oil and water supply systems.

Also included in the preparatory phase for the foundation configuration under consideration here is the erection of supplementary pillars 14. With a spacing a, they serve to support the overhanging part of the new base plate 7b at the erection site. These pillars 14 are preferably cast so as to stand against the individual supports 8a supporting the endmost (i.e., the low pressure) turbine unit.

In addition, the parking place for the generator 5a to be pushed aside is prepared, and displacement tracks 15 on auxiliary supports 16 are partially constructed.

The auxiliary supports 16 are only partially constructed because the space underneath the still running generator 5a is still unaccessible at this point in time. On the other hand, it is possible to lay the displacement track 15 (dotted lines in FIG. 4) under the new generator 5b. To this end the new structural unit, comprising the base plate plus generator, is raised a little by auxiliary means; the displacement tracks 15 are drawn underneath the base plate; and the unit is then lowered onto the displacement track.

Finally, a further lifting device is erected over the generator 5a. For this purpose, 8 supporting pillars 17 are raised to the side of the base plate 7a. Each pair of opposite pillars 17 is linked above the generator by a strut 18. The elements 17, 18 thus form 4 portals.

The preparatory phase can now be said to be complete.

The replacement phase necessarily begins with the switching-off ofthe turbo set. The generator 5a is disconnected from the last (i.e., the low pressure) turbine subunit. All electrical and pipe connections are broken.

In a first solution the generator 5a is disconnected from the base plate 7a and removed separately; the rotor being removed, if necessary, because of the high overall weight. The base plate 7a can then be broken up.

In a second, substantially quicker solution, the generator 5a is displaced, together with its base plate 7a, to the ready prepared parking place.

To this end the base plate 7a is secured to the portals 17, 18 at 8 points by means of hauling cables.

The mechanical separation procedure is then carried out. The most expedient planes of separation are shown in FIG. 2 by the lines d—d and e—e.

Figure 3:
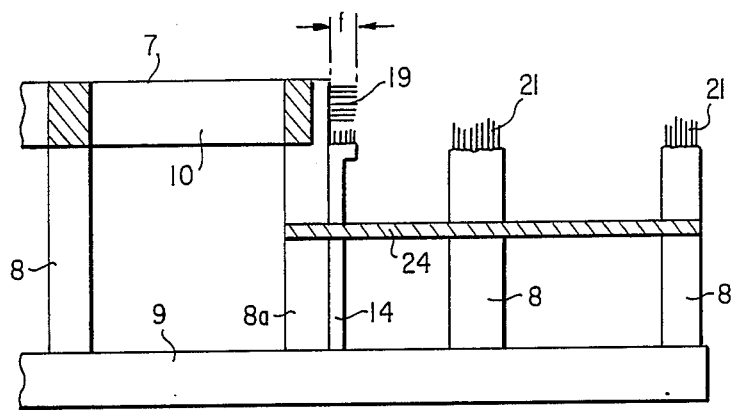
FIG. 3 is a partial view of the foundation after the base plate section has been broken away.

In the case of the plane of separation of d—d, where the base plate section 7a is detached from the common base 7, care should be taken that the cut is not made immediately behind the individual supports 8a. Rather the cut should be shifted by the amount f. The idea behind this is to use steel reinforcing rods 19 present in section f for connecting up with the new base plate section 7b. The concrete slabs in section f are subsequently scabbled manually, thus exposing the steel reinforcing rods 19 (FIG. 3).

At the point of section e—e on the 4 individual supports 8, it is impossible to avoid severing the reinforcing rods at the same time.

Once the separation is complete, the base plate 7a is raised by means of the abovementioned hauling cables; the displacement track 15 is laid under the base plate 7a; and the base plate 7a is then lowered onto the displacement track 15 and is then capable of being displaced.

Hydraulic means which are known per se are used to manoeuvre the severed base plate over the Teflon-coated displacement track, initially in the direction of the machine axis, then transverse to this direction, to the ready prepared parking place.

The free end faces of the severed individual supports 8 can be prepared at as early a stage as this operation for the reception of the new base plate 7b. According to FIG. 5, holes 20 are bored in the supports. This measure is also carried out on the supplementary pillars 14. These holes which, as a rule, are longitudinal bores, are intended to receive new reinforcing elements 21 (FIG. 3). It goes without saying that corresponding holes 20' have already been made in the underside of the new base 7b during the preparatory phase. During the displacement phase, it is also possible to expose the abovementioned steel reinforcing rods 19 of the base 7.

The new structural unit 5b, 7b is then displaced by the hydraulic means into its final position via the displacement track 15. During this movement the structure rests on the adjusting elements 13 with the same support intervals as in the preparatory phase. The deformation behavior of the unit thus remains constant. In order to compensate for any unevenness in the displacement track, hydraulic flat presses of a type known per se are attached to the auxiliary supports 16 to allow extra fine adjustment of the track height.

Figure 5:
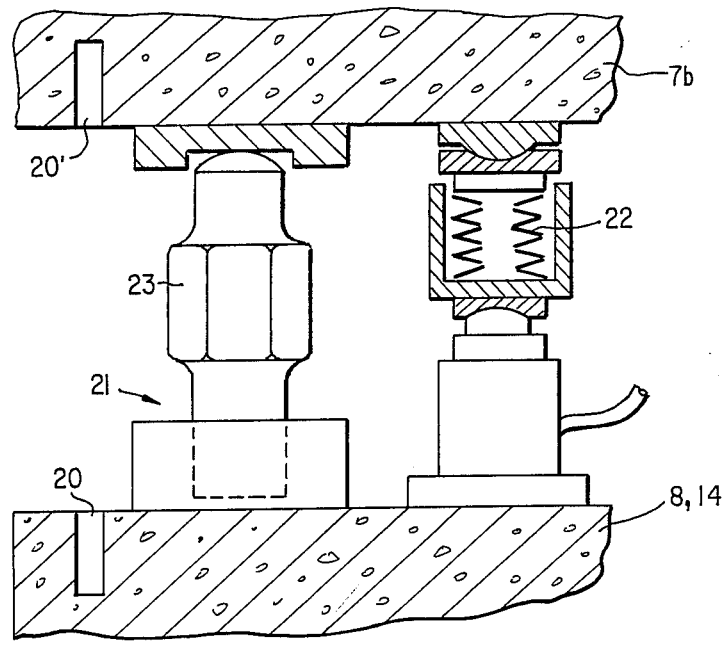
FIG. 5 shows an adjusting element and an adjusting spring on an individual support.

In the final position, the structural unit is suspended from the portals 17, 18 by means of the above-mentioned hauling cables. The displacement track 15 underneath the base 7b is disassembled. The adjusting elements 13 are arranged at the correct intervals a, b, c on the individual supports 8 and the supplementary pillars 14, and the unit is then lowered onto the adjusting elements 13. The adjusting elements 13 used are simple bolts 23, the height of which can be adjusted by means of a screw thread (FIG. 5).

The unit is then aligned in all planes. For this purpose, adjusting springs 22 are laid on the free ends of the supports 8 and the pillars 14 in accordance with FIG. 5.

Vertical positioning and the adjustment of the axial run-out in the connection plane are carried out exclusively via these hydraulically operated adjusting springs; the adjusting elements 13 merely follow this adjustment. The underlying intention here is to avoid causing deformations when the base is raised at a particular point since, for example, in the case of rigid positioning elements, the base would lift off at another point and might be deformed as a result.

Alignment in the longitudinal and transverse directions is carried out by means of appropriately arranged displacement devices. During these operations the base 7b continues to rest exclusively on the adjusting springs 22. The adjusting springs 22 make possible relatively large horizontal movements, although they would admittedly spring back into place if the load on the respective displacement device were to be released and would thus negate the adjustment which had been carried out. If, for example, a lateral displacement of a few centimeters is to be carried out, this will be done in several stages: displace—readjust adjusting elements—release springs, displace—readjust adjusting elements—release springs, etc.

After final adjustment, the adjusting springs 22 are removed. The structural unit now rests exclusively on the 6 adjusting elements 13. The generator 5b can now be connected to the turbine. The electrical and pipe connections between the generator and its auxiliary units can be made as early as the alignment procedure. The latter are, as a rule, set up underneath a generator on the intermediate platform 24 shown in FIG. 3.

Finally, the new base plate 7b is connected monolithically to the turbine base 7 and the supports 8, 14. The adjacent end face of the new base 7b is of course likewise provided with steel connecting rods. These are interwoven with the steel reinforcing rods 19. The remaining gap between the sections 7 and 7b of the base is provided with shuttering and grouted with concrete. At the supplementary supports 8 and the pillars 14, the new reinforcing element 21 around the adjusting elements 13 is introduced into the holes 20, 20'; shuttering is erected; and the reinforcing element and the adjusting elements are grouted with concrete.

This concludes the replacement procedure. There is now nothing to prevent final pipework, a concluding test, and subsequent commissioning from going ahead.

It remains to be said that, in the case of a 1,000 MW steam power generating plant in which the masses, 5a, 7a and 5b, 7b respectively, which are to be moved, each weigh about 2,000 tones, the all-important replacement phase requires less than 3 weeks.

The invention is of course not restricted to the method illustrated and described. Deviating from the generator replacement procedure which has been explained, it is of course also possible to replace single or multiple turbine units in the same manner.

List of reference symbols

1 High-pressure turbine subunit
2 Intermediate-pressure turbine subunit
3 Low-pressure turbine subunit
4 Condenser
5 Generator
5a Old generator
5b New generator
6 Exciter
7 Common base plate
7a Section of base plate to be removed
7b New base plate section
8 Individual support
8a Individual support underneath last low pressure turbine 9
9 Base slab
10 Recess for low-pressure turbine
11 Recess for generator
12 Unused foundation
13 Adjusting element
14 Supplementary pillar
15 Displacement track
16 Auxiliary support
17 Support pillar
18 Strut
19 Steel reinforcing rods in 7
20, 20' Holes for reinforcing elements 21
21 Reinforcing elements in 8 and 14
22 Adjusting spring
23 Bolt of 13
24 Intermediate platform
a,b,c Support intervals
d—d Plane of section for 7/7a
e—e Plane of section for 7a/8
f Section for manual scabbling

I claim
1. A method of replacing a machine part of a machine installation the central interconnected machine parts of which are arranged on a common base plate which is secured in the ground, either directly or via a base slab, by individual supports, said method comprising the steps of:
 (a) producing a purpose-built base plate on newly erected auxiliary supports or on an adjacent foundation slab for the machine part newly to be connected, the purpose-built base plate resulting on the auxiliary supports or on an existing foundation slab via adjusting elements; then, on the purpose-built base plate:
 (b) providing the machine part newly to be connected with mountings;
 (c) finally assembling the machine part newly to be connected; and
 (d) testing the functions of the machine part newly to be connected; then:
 (e) disconnecting the machine part to be replaced from the remaining machine parts; and
 (f) severing the base plate section of the machine part to be replaced from the base plate of the remaining machine parts and from the individual supports; then:
 (g) displacing the structural unit comprising the "machine part/base plate newly to be connected" to take the place of the severed base plate;
 (h) lowering the structural unit comprising the "machine part/base plate newly to be connected" onto the individual supports by means of the adjusting elements;
 (i) aligning the structural unit comprising the "machine part/base plate newly to be connected"; and
 (j) monolithically connecting the structural unit comprising the "machine part/base plate newly to be connected" to the base plate section of the remaining parts and the individual supports so that it rests exclusively on the aligning elements.

2. The method recited in claim 1 wherein, during steps (a)–(c), the adjusting elements are the same distance apart on the corresponding individual supports underneath the machine part to be replaced.

3. A method as recited in claim 1 wherein, during transport over a displacement track, the support intervals of the base plate are at least approximately the same as during steps (a)–(c).

4. A method as recited in claim 3 and further comprising the step of providing the auxiliary supports for the new structural unit with flat presses for fine adjustment of the track heights during the displacement in order to avoid deformations due to unevenness in the displacement track.

5. A method as recited in claim 1 wherein:
   (a) the vertical position of the structural unit comprising the "machine part/base plate newly to be connected" and the adjustment of the axial run-out in the connection plane are carried out by means of adjusting springs which likewise rest on the severed free end faces of the individual supports and
   (b), during the exact positioning of the structural unit comprising the "machine part/base plate newly to be connected" in the longitudinal and transverse directions, the base plate is supported solely on the adjusting springs.

6. A method as recited in claim 1 and further comprising the step of casting supplementary pillars against the immediately adjacent individual supports of the remaining machine parts in order to support the overhanging section of the new base plate which is to be connected to the base plate section of the remaining machine parts.

7. A method as recited in claim 1 wherein:
   (a) the base plate and the individual supports are made of steel-reinforced concrete and
   (b), to connect the base plate monolithically to the individual supports, longitudinal bores are provided in the underside of the base plate and in the free end faces of the individual supports to recieve reinforcing elements which, together with the respective adjusting elements, are grouted with concrete.

8. A method as recited in claim 1 and further comprising the steps, after step (f), of:
   (a) removing the machine part to be replaced by lifting means and
   (b) breaking away the separate base plate.

9. A method as recited in claim 1 wherein, in step (g), the machine part to be replaced is displaced together with the severed base plate onto an auxiliary structure.

10. A method as recited in claim 1 wherein, in step (g), the structural unit comprising the "machine part/base plate newly to be connected" is displaced by hydraulic means.

* * * * *